(12) United States Patent
Herrmann et al.

(10) Patent No.: US 11,366,938 B2
(45) Date of Patent: Jun. 21, 2022

(54) METHOD AND DEVICE FOR OPERATING A BUS SYSTEM

(71) Applicant: Robert Bosch GmbH, Stuttgart (DE)

(72) Inventors: Benjamin Herrmann, Ludwigsburg (DE); Liem Dang, Ludwigsburg (DE); Antonio La Marca, Leonberg (DE); Timo Gentner, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 469 days.

(21) Appl. No.: 16/338,740

(22) PCT Filed: Sep. 20, 2017

(86) PCT No.: PCT/EP2017/073764
§ 371 (c)(1),
(2) Date: Apr. 2, 2019

(87) PCT Pub. No.: WO2018/065215
PCT Pub. Date: Apr. 12, 2018

(65) Prior Publication Data
US 2021/0286908 A1    Sep. 16, 2021

(30) Foreign Application Priority Data

Oct. 7, 2016 (DE) .......................... 102016219475.5

(51) Int. Cl.
*G06F 21/85*  (2013.01)
*G06F 21/55*  (2013.01)
*G06F 21/56*  (2013.01)

(52) U.S. Cl.
CPC ............ *G06F 21/85* (2013.01); *G06F 21/554* (2013.01); *G06F 21/564* (2013.01)

(58) Field of Classification Search
CPC ....... G06F 21/85; G06F 21/554; G06F 21/564
See application file for complete search history.

(56) References Cited

U.S. PATENT DOCUMENTS

| 8,943,313 B2* | 1/2015 | Glew ...................... G06F 21/72 |
| | | 713/162 |
| 10,452,849 B2* | 10/2019 | Vroom .................... G06F 21/81 |
| 10,757,114 B2* | 8/2020 | Ruvio .................... B60R 25/00 |
| 10,764,316 B2* | 9/2020 | Maylor .................. H04L 51/12 |

(Continued)

FOREIGN PATENT DOCUMENTS

| CN | 105634894 A | 6/2016 |
| DE | 102009050767 A1 | 5/2011 |

(Continued)

OTHER PUBLICATIONS

International Search Report for PCT/EP2017/073764, dated Nov. 6, 2017.

*Primary Examiner* — Viral S Lakhia
(74) *Attorney, Agent, or Firm* — Norton Rose Fulbright US LLP; Gerard Messina

(57) ABSTRACT

A method for operating a bus system, in which a message of the bus system is received and its validity is ascertained, wherein, if it was ascertained that the message is "malicious", a new message is sent to the designated receiver of this "non-malicious" message, the content of the new message having been previously rated as "non-malicious."

4 Claims, 2 Drawing Sheets

(56) References Cited

U.S. PATENT DOCUMENTS

| | | | | |
|---|---|---|---|---|
| 2007/0098013 | A1* | 5/2007 | Brown | H04L 41/00 |
| | | | | 370/466 |
| 2008/0295170 | A1* | 11/2008 | Gupta | H04L 67/104 |
| | | | | 726/22 |
| 2013/0134774 | A1* | 5/2013 | Kennedy | G06F 1/26 |
| | | | | 307/2 |
| 2015/0020152 | A1* | 1/2015 | Litichever | H04L 63/08 |
| | | | | 726/1 |
| 2016/0366178 | A1* | 12/2016 | Wesie | H04L 63/1416 |
| 2017/0072321 | A1* | 3/2017 | Thompson | A63F 13/61 |
| 2017/0078321 | A1* | 3/2017 | Maylor | H04L 51/12 |
| 2017/0302452 | A1* | 10/2017 | Nanjundappa | H04W 12/03 |

FOREIGN PATENT DOCUMENTS

| | | |
|---|---|---|
| DE | 102015205670 A1 | 6/2016 |
| DE | 102016101327 A1 | 7/2016 |
| DE | 102016212816 A1 | 1/2018 |
| EP | 2075655 A1 | 7/2009 |

* cited by examiner

METHOD AND DEVICE FOR OPERATING A BUS SYSTEM

FIELD

The present invention relates to a method for operating a bus system, in particular in a motor vehicle, a computer program and a control and/or regulating device for implementing the method and to a machine-readable memory medium on which the computer program is stored.

BACKGROUND INFORMATION

German Patent Application No. DE 10 2016 212 816 describes a method for operating a bus system, in which a message of the bus system is received and its validity (i.e., non-maliciousness) is ascertained, wherein, if it was ascertained that the message is "not valid" (i.e., "malicious"), a defense message is transmitted to a designated receiver of the message, the defense message being designed in such a way that the designated receiver is instructed by the defense message to initiate defensive measures against the message.

SUMMARY

In accordance with the present invention, an method is provided which may have the advantage of making it possible to detect irregular interventions in a network of this bus system and to be able to ensure in a particularly simple manner a further availability of the bus system.

Advantageous developments of the present invention are described herein.

In accordance with the present invention, instead of sending a message with the objective of triggering a substitute reaction in the receiver (as is described in German Patent Application No. DE 10 2016 212 816), a method of warding off an attack may transmit a message with the original data that were not manipulated by the attacker. This makes it possible to continue the operation in the receiver with the data from the genuine, non-malicious transmitter without triggering a substitute reaction.

A first aspect of the present invention is therefore a method for operating a bus system, in which a message of the bus system is received and its validity (i.e., non-maliciousness) is ascertained, wherein, if it was ascertained that the message is "malicious", a new message is transmitted to the designated receiver of this "malicious" message, the content of the new message having been previously rated as "non-malicious."

This has the advantage that the function behind the transmission of the message continues to be available.

In particular there may be a provision for the content of the new message to be identical to the content of a previous message transmitted to the designated receiver, the validity of this previous message also having been ascertained and rated as "non-malicious."

This makes it possible in a particularly simple manner to avoid service interruptions of the mentioned function.

In an attack on a component of a motor vehicle, for example on an automated transmission, which receives the commands for changing the driving mode (parking, neutral, drive, reverse) via a bus system from a selector lever unit, the method of the present invention yields advantages as follows. When warding off an attack by triggering a substitute reaction in the automated transmission (via, e.g., false CRC), it is true that the attack can be warded off in the sense that the attacker is not able to engage the reverse gear at a traffic signal. It is possible, however, that because of the substitute reaction the driver is also no longer able to change the driving mode via the selector lever unit.

As a result it is possible that the vehicle is no longer 100% ready for operation. If, instead of sending a message for triggering a substitute reaction, the original message of the selector lever unit is used as a defense, the function of the selector lever remains available without restriction.

One development may provide for the previous message to be last message that is rated as "non-malicious", which was transmitted to the designated receiver before the message rated as "malicious." This method is particularly simple to implement.

It is possible to revert to the content of the previous message by providing for storing the received message if it was rated as "non-malicious." This is particularly simple. Alternatively, it is possible to extract and store relevant components of the message rated as "non-malicious."

In another aspect of the present invention, the method may be adapted in that a decision is made as a function of received stored messages as to whether the message is rated as "non-malicious."

Specific embodiments of the present invention are explained in greater detail below with reference to the figures.

DETAILED DESCRIPTION OF EXAMPLE EMBODIMENTS

Figure 1:
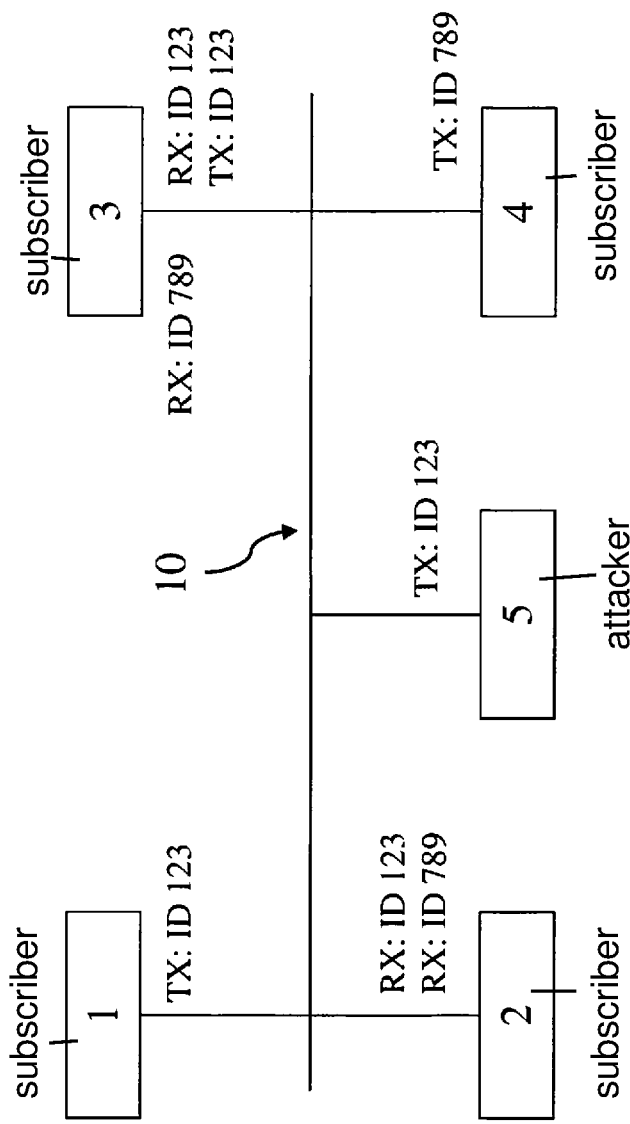
FIG. 1 shows a schematic representation of a network in which the method of the invention may be used.

FIG. 1 shows in exemplary fashion a network having a bus system 10, via which subscribers 1, 2, 3, 4 communicate. Subscribers 1, 2, 4 may be control units for example, or for example sensors. Subscriber 3 is a control unit in which the invention is implemented in the exemplary embodiment.

Via bus system 10, subscribers 1, 2, 3, 4 exchange messages, each of which is provided with an identifier ("ID"). In FIG. 1, the transmission of a message is indicated by "TX" and the associated identifier of the transmitted message, while the reception of a message is indicated by "RX" and the associated identifier of the received message. In FIG. 1, subscriber 1 transmits a message having the identifier "123". This message is received by subscriber 2. Subscriber 4 transmits a message having the identifier "789". This message is received by subscribers 2 and 3.

In the exemplary embodiment, subscriber 3 receives all messages defined in network 10. An attacker 5, who is likewise a subscriber in network 10, also transmits a message having identifier "123". Subscriber 2 receives this message as well, but does not recognize it as an attack since for example the CRC code of the message having identifier "123" was reproduced correctly. Subscriber 2 therefore uses the manipulated message content in processing its program code. Subscriber 3, however, recognizes (for example by a plausibility check of the data content of message "123") that message "123" is not valid (i.e., malicious) and is able to initiate defensive measures.

Figure 2:
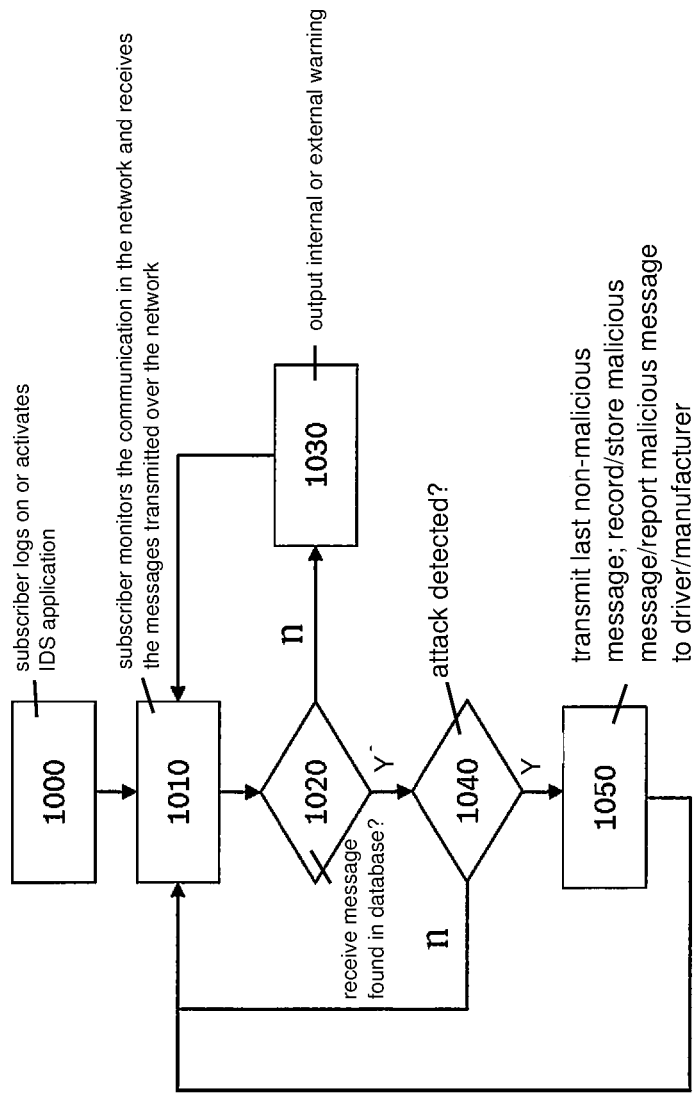
FIG. 2 shows a flow chart of the method according to one aspect of the invention.

FIG. 2 shows the sequence of the method that is implemented in subscriber 3 in the exemplary embodiment illustrated in FIG. 1. Subscriber 3 has a machine-readable storage medium, for example, on which a computer program is stored that performs the steps of this method when it is executed on subscriber 3, i.e., the computer program is designed to carry out this method.

The method begins in step 1000, in which subscriber 3 logs on, for example, in network 10 or activates an IDS application. This is followed by step 1010, in which subscriber 3 monitors the communication in network 10 and receives the messages transmitted over the network. These messages may be buffered in a queue for example. The subsequent steps are advantageously carried out individually for each one of the messages.

Processing a received message begins in subsequent step 1020. In this step, a check is performed to determine whether the received message is of a known type. This may be done, for example, by checking a database, in which messages are stored in a searchable manner according to characteristic properties (for example the reactions they trigger in their designated receiver). If the received message is found in such a database, its type counts as known, otherwise as unknown. If this is not the case (output "n"), i.e. if the received message is not of a known type, the method proceeds to step 1030, in which optionally an internal or external warning may be output that an unknown messages was received, and the method branches back to step 1010.

If, by contrast, the message is known (output "y"), the method proceeds with step 1040, in which a check is performed to determine whether the message is "non-malicious" or "malicious". If the message is "malicious", an attack is detected (output "y), and the method proceeds to step 1050, otherwise (output "n") the message is stored in a list of non-malicious messages, and the method branches back to step 1010.

In step 1050, subscriber 3 checks in the list of non-malicious messages, which non-malicious message was most recently transmitted to the designated receiver. Subscriber 3 now transmits the last non-malicious message, which was transmitted to the designated receiver, anew to the designated receiver.

Optionally, in step 1050, the message detected as "malicious" is recorded and stored in a memory in the motor vehicle and/or outside of the motor vehicle. Alternatively or additionally, the fact that the message was detected as "malicious" may be reported to the driver of the motor vehicle or e.g. to the manufacturer. This may be done, for example via a notification on the dashboard and/or via an infotainment system and/or via a communication to connected services outside of the motor vehicle.

This run of the method thus ends, and the method branches back to step 1010.

There may be a provision that subscriber 3 transmits the most recent non-malicious message until subscriber 3 no longer detects manipulations.

What is claimed is:

1. A method for operating a bus system, comprising:
   receiving a first message intended for a designated receiver of the bus system;
   ascertaining that the received first message is not malicious;
   responsive to the ascertainment of the received first message being not malicious:
      storing the first message; and
      transmitting the first message to the designated receiver;
   subsequent to the transmitting of the first message to the designated receiver, receiving a second message of the bus system that is intended for the designated received;
   ascertaining that the received second message is malicious; and
   responsive to the ascertainment of the second message being malicious, and based on the first message being a last of a plurality of messages that were (a) previously received, (b) intended for the designated receiver, and (c) previously ascertained to be not malicious, re-transmitting at least part of the stored first message to the designated receiver instead of transmitting the second message to the designated receiver.

2. The method as recited in claim 1, wherein the ascertainments of the first message being not malicious and the second message being malicious are made as a function of received and stored messages.

3. A non-transitory machine-readable storage medium on which is stored a computer program for operating a bus system that is executable by a computer and that, when executed by the computer, causes the computer to perform a method, the method comprising:
   receiving a first message intended for a designated receiver of the bus system;
   ascertaining that the received first message is not malicious;
   responsive to the ascertainment of the received first message being not malicious:
      storing the first message; and
      transmitting the first message to the designated receiver;
   subsequent to the transmitting of the first message to the designated receiver, receiving a second message of the bus system that is intended for the designated received;
   ascertaining that the received second message is malicious; and
   responsive to the ascertainment of the second message being malicious, and based on the first message being a last of a plurality of messages that were (a) previously received, (b) intended for the designated receiver, and (c) previously ascertained to be not malicious, re-transmitting at least part of the stored first message to the designated receiver instead of transmitting the second message to the designated receiver.

4. A control and/or regulating device, which is configured to carry out a method for operating a bus system, the method comprising:
   receiving a first message intended for a designated receiver of the bus system;
   ascertaining that the received first message is not malicious;
   responsive to the ascertainment of the received first message being not malicious:
      storing the first message; and
      transmitting the first message to the designated receiver;
   subsequent to the transmitting of the first message to the designated receiver, receiving a second message of the bus system that is intended for the designated received;
   ascertaining that the received second message is malicious; and
   responsive to the ascertainment of the second message being malicious, and based on the first message being a last of a plurality of messages that were (a) previously received, (b) intended for the designated receiver, and (c) previously ascertained to be not malicious, re-transmitting at least part of the stored first message to the designated receiver instead of transmitting the second message to the designated receiver.

* * * * *